Patented Feb. 23, 1926.

1,573,928

UNITED STATES PATENT OFFICE.

EVERETT W. FULLER, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

AGE-RESISTING RUBBER COMPOUND AND METHOD OF MAKING THE SAME.

No Drawing.　　Application filed April 27, 1925.　Serial No. 26,300.

*To all whom it may concern:*

Be it known that I, EVERETT W. FULLER, a citizen of the United States of America, residing at Springfield, in the county of Hampden and State of Massachusetts, have invented certain new and useful Improvements in an Age-Resisting Rubber Compound and Method of Making the Same, of which the following is a specification.

This invention relates to vulcanized rubber compositions and to methods of making the same, and has particular reference to increasing the age-resisting qualities of rubber compounds while at the same time assisting the accelerating of vulcanization. Various compounds, such as pyrogallol, hydroquinone, phenols, naphthols, and non-accelerating condensation products of aldehyde amines, have been proposed for use as age-resistors in rubber compounds. Such substances, when they do improve the ageing properties of rubber compounds, serve otherwise no useful purpose and their use means an added expense for this purpose alone.

I have found, however, that certain nitroso compounds of the aromatic series have in a marked degree the property of imparting good ageing qualities to rubber mixtures when incorporated therein with an organic accelerator and a vulcanizing agent such as sulphur, and at the same time they assist the acceleration of vulcanization so that less of the organic accelerator is needed to effect a cure in a given time. These nitroso compounds, therefore, serve the double purpose of age-resistors and accelerators. In particular I have found useful in this connection the metallic salts of alpha-nitroso-beta-naphthol, such as the sodium salt. These compounds probably have the structural formula:

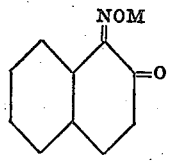

where M is a metal of the alkali or alkaline earth group. Such compounds are comparatively cheap and easy to prepare, are stable, and have considerable effect as age-improvers while at the same time assisting in the acceleration of the cure.

To illustrate the manner of use and the effect such nitroso compounds have on the ageing properties and cure of rubber mixtures, the following examples are given. Type formulæ for the rubber mixture are chosen, accelerated by the well-known di-ortho-tolyl-guanidine and the polymerization product of ethylidene aniline respectively. The desired effect may be produced, however, in rubber mixtures of other composition and accelerated by other organic accelerators, and the age-improving and accelerating characteristics of these nitroso compounds are not limited to the specific rubber mixture given.

*Example I.*—The following rubber mixtures were prepared, quantities being expressed in grams.

|  | A. | B. | C. | D. |
|---|---|---|---|---|
| Rubber | 100 | 100 | 100 | 100 |
| Zinc oxide | 100 | 100 | 100 | 100 |
| Sulphur | 3 | 3 | 3 | 3 |
| Di-ortho-tolyl-guanidine | ⅜ | ⅜ | ⅜ | ⅜ |
| Sodium salt of nitroso-β-naphthol | 0 | 0 | 1 | ½ |

Test slabs were cured in a press for 30 minutes at 50 pounds steam pressure. The cured slabs were given the accelerated ageing test that is generally used for determining the ageing properties of rubber mixtures, and that has been described by W. W. Evans in the Proceedings of the American Society for Testing Materials, vol. 22, Part II, page 549 (1922). The tensile at break and % elongation at break at the start indicate the relative states of cure of the above mixtures, while the tensile at break after 15 days accelerated ageing indicate the age-resisting properties of the mixtures. To bring out more clearly the latter point, the final tensile is also given in percent of the original tensile.

|  | Original. | | 15 days' ageing. | |
|---|---|---|---|---|
|  | Tensile. | % elongation. | Tensile. | % of original. |
| Mixture A | 2790 | 6.00 | 1500 | 54 |
| Mixture B | 3270 | 5.85 | 1950 | 60 |
| Mixture C | 3330 | 5.90 | 2340 | 70 |
| Mixture D | 3000 | 5.80 | 2170 | 72 |

The increase in original tensiles and relative decrease in % elongations indicate that the addition of the above age-resistors has increased the acceleration of cure above that of mixture A, with the lesser amount of di-ortho-tolyl-guanidine, and nearly or actually equal to that of mixture B with the larger amount of organic accelerator. The higher final tensiles after ageing show the improvement in ageing properties secured by the use of these age-resistors.

*Example II.*—These age-resistors are also effective in those types of compounds having a low zinc oxide content, as shown in the following examples.

|  | E. | F. | G. | H. | I. |
|---|---|---|---|---|---|
| Rubber | 100 | 100 | 100 | 100 | 100 |
| Zinc oxide | 6 | 6 | 6 | 6 | 6 |
| Sulphur | 3½ | 3½ | 3½ | 3½ | 3½ |
| Di-ortho-tolyl-guanidine | ⅜ | ⅜ | ⅜ | ⅜ | ⅜ |
| Sodium salt of nitroso-β-naphthol | ⅝ |  | 1 |  |  |
| Potassium salt nitroso-β-naphthol |  |  |  | 1 |  |
| Calcium salt nitroso-β-naphthol |  |  |  |  | 1 |

Test slabs were cured 30 minutes at 50 pounds steam pressure in a press and were given the accelerated ageing test as in Example I.

|  | Original. | | 15 days' ageing. | |
|---|---|---|---|---|
|  | Tensile. | % elongation. | Tensile. | % of original. |
| Mixture E | 2430 | 6.90 | 1070 | 44 |
| Mixture F | 3200 | 6.60 | 1300 | 41 |
| Mixture G | 2940 | 6.40 | 2030 | 69 |
| Mixture H | 3170 | 6.50 | 2200 | 69 |
| Mixture I | 3200 | 6.40 | 2140 | 67 |

Again the increase in original tensile with corresponding decrease in % elongation indicate the accelerating action of the age-resistors, while the final tensiles after 15 days' ageing show the improvement in ageing properties of the mixtures containing these compounds.

*Example III.*—The effect of the addition of one of these age-resistors to a mixture accelerated with the polymerization product of ethylidene aniline is shown by the following results.

|  | J. | K. |
|---|---|---|
| Rubber | 100 | 100 |
| Zinc oxide | 100 | 100 |
| Sulphur | 3 | 3 |
| Polymerization product of ethylidene aniline | ¾ | ¾ |
| Sodium salt nitroso-β-naphthol |  | 1 |

Test slabs were cured 45 minutes at 50 pounds steam in a press and were given the above described ageing test for 11 days.

|  | Original. | | 11 days' ageing. | |
|---|---|---|---|---|
|  | Tensile. | % elongation. | Tensile. | % of original. |
| Mixture J | 3120 | 6.40 | 1750 | 56 |
| Mixture K | 3400 | 6.20 | 2440 | 72 |

*Example IV.*—In the following case the addition of the age-resistor has allowed the amount of organic accelerator to be cut to one half that used in the control while the ageing properties of the mixture are improved.

|  | L. | M. |
|---|---|---|
| Rubber | 100 | 100 |
| Zinc oxide | 6 | 6 |
| Sulphur | 3½ | 3½ |
| Polymerization product of ethylidene aniline | 1 | ½ |
| Sodium salt nitroso-β-naphthol |  | 1 |

Test slabs were cured 45 minutes at 35 pounds steam pressure in a press and were given the above described ageing test for 17 days.

|  | Original. | | 17 days' ageing. | |
|---|---|---|---|---|
|  | Tensile. | % elongation. | Tensile. | % of original. |
| Mixture L | 2700 | 7.60 | 1560 | 58 |
| Mixture M | 2690 | 7.50 | 2490 | 92 |

The addition of one part of sodium nitroso-β-napthol has fully compensated for one half part of the accelerator in accelerating action and has at the same time greatly improved the ageing properties of the mixture.

The above examples serve to show the manner of use and the improvement in rate of vulcanization and in ageing properties secured by the addition of various salts of alpha-nitroso-beta-naphthol to accelerated rubber mixtures. Such improved conditions are not limited to the specific mixtures or derivatives of nitroso-beta-naphthol mentioned, as both mixture and added nitroso-beta-naphthol derivative may be varied in character and amount from the above examples. Certain of the nitroso-beta-naphthol derivatives may function more satisfactorily in some mixtures than in others, but the examples given are sufficient to instruct those skilled in the art in the use of this invention without naming the optimum conditions for all variations in its use.

Having thus described my invention, I claim:

1. A method of making rubber products having improved ageing qualities which comprises adding an alkali or alkaline earth salt of alpha-nitroso-beta-naphthol to a vulcanizable rubber compound and vulcanizing the mixture.

2. A method of making rubber products having improved ageing qualities which comprises adding an alkali or alkaline earth salt of alpha-nitroso-beta-naphthol to a vulcanizable rubber compound containing a subnormal quantity of an organic accelerator and vulcanizing the mixture.

3. A method of making rubber products having improved ageing qualities which comprises adding a small quantity of the sodium salt of alpha-nitroso-beta-naphthol to a vulcanizable rubber compound and vulcanizing the mixture.

4. Vulcanized rubber containing the reaction product of rubber, sulphur, and an alkali or alkaline earth salt of alpha-nitroso-beta-naphthol.

5. Vulcanized rubber containing the reaction product of rubber, sulphur, zinc oxide, an organic accelerator, and an alkali or alkaline earth salt of alpha-nitroso-beta-naphthol.

6. Vulcanized rubber containing the reaction product of rubber, sulphur, and the sodium salt of alpha-nitroso-beta-naphthol.

7. Vulcanized rubber containing the reaction product of rubber, sulphur, zinc oxide, an organic accelerator, and the sodium salt of alpha-nitroso-beta-naphthol.

EVERETT W. FULLER.